(12) United States Patent
Smirnov et al.

(10) Patent No.: US 8,015,578 B2
(45) Date of Patent: Sep. 6, 2011

(54) DISK CHUCKING APPARATUS AND DISK DRIVE HAVING THE SAME

(75) Inventors: Viatcheslav Smirnov, Suwon-si (KR); Pyo Kim, Suwon-si (KR); Young-Sun Yoo, Suwon-si (KR); Nam-Seok Kim, Osan-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 792 days.

(21) Appl. No.: 12/149,679

(22) Filed: May 6, 2008

(65) Prior Publication Data

US 2009/0007165 A1    Jan. 1, 2009

(30) Foreign Application Priority Data

Jun. 27, 2007   (KR) .................. 10-2007-0063537

(51) Int. Cl.
   *G11B 17/03*   (2006.01)
(52) U.S. Cl. ...................................... 720/707
(58) Field of Classification Search .............. 720/707, 720/604, 702, 623, 610, 703, 614, 600, 709, 720/706, 603, 619, 712, 605
   See application file for complete search history.

(56) References Cited

U.S. PATENT DOCUMENTS

| | | | |
|---|---|---|---|
| 7,313,801 B2* | 12/2007 | Choi et al. | 720/709 |
| 7,667,362 B2* | 2/2010 | Shiga | 310/91 |
| 2006/0048176 A1* | 3/2006 | Choi et al. | 720/707 |
| 2009/0106782 A1* | 4/2009 | Smirnov et al. | 720/604 |
| 2009/0119690 A1* | 5/2009 | Smirnov et al. | 720/604 |

FOREIGN PATENT DOCUMENTS

| | | |
|---|---|---|
| JP | 2004-171706 | 6/2004 |
| KR | 10-2005-0095085 | 9/2005 |

OTHER PUBLICATIONS

Korean Patent Office Action, mailed Aug. 25, 2008 and issued in corresponding Korean Patent Application No. 10-2007-0063537.

* cited by examiner

*Primary Examiner* — Allen Cao (57) ABSTRACT

This disk chucking apparatus may include: a chuck bass having a plurality of holding portions, a plurality of chuck pins which are inserted in the holding portions to be elastically supported, and protrudes out from the chuck base, an elastic fragment which is arranged to be symmetrical to the chuck pin with respect to the rotation center of the chuck base, and elastically supports a disk together with the chuck pin, and wherein the elastic fragment has an inclined surface inclined with respect to a direction of equipment of the disk, and the inclined surface are increased from smaller radius than the inner radius of the disk to larger radius than the inner radius of the disk. This disk chucking apparatus make it possible to align the centers of the chuck base and disk, and to decrease the force in mounting a disk.

36 Claims, 13 Drawing Sheets

FIG. 9C

DISK CHUCKING APPARATUS AND DISK DRIVE HAVING THE SAME

CROSS-REFERENCE TO RELATED APPLICATIONS

This application claims the benefit of Korean Patent Application No. 10-2007-0063537, filed with the Korean Intellectual Property Office on Jun. 27, 2007, the disclosure of which is incorporated herein by reference in its entirety.

BACKGROUND

1. Technical Field

The present invention relates to a disk chucking apparatus and a disk drive having the disk chucking apparatus.

2. Description of the Related Art

In general, a disk drive includes a deck base, which forms a main body, loading means for loading or unloading a disk onto or from the deck base, means for rotating the disk loaded onto the loading means at a constant speed, and means for recording or retrieving information onto or from a recording surface of the disk while traversing across the radius of the disk being rotated by the rotating means. The disk can be loaded or unloaded while being placed on a tray, or encased in a cartridge to be received into or ejected from the deck base.

A spindle motor is employed to rotate the disk, and a pickup unit may typically be used to record or retrieve information onto/from the recording surface of the disk. Also, a disk chucking device for securing the disk is equipped on the deck base, and the disk is inserted onto a chuck base and secured by, for example, chuck pins.

It is important to align the centers of chuck base and the disk that will be mounted on the chuck base. If there is a misalignment, high-speed rotation of the disk can further increase the eccentricity between the centers and can make vibrations and noises. Also, if the centers of the chuck base and the disk are not aligned, it may be impossible for a pickup unit to accurately record or retrieve information.

Also, as the disk is press-fitted on the disk chucking apparatus, stress can be concentrated on parts contacting with the disk. If this stress concentration is reiterated, the disk chucking apparatus may be deformed or damaged by fatigue strength. Furthermore, this may prevent the centers of the disk and the chuck base from being aligned.

SUMMARY

The present invention provides a disk chucking apparatus and a disk drive having the disk chucking apparatus, in which the centers of the chuck base can be aligned easily.

The present invention also provide a disk chucking device and a disk drive having the disk chucking apparatus, in which the force required to equip a disk can be reduced The present invention also provides a disk chucking device and a disk drive having the disk chucking apparatus, in which a coupling strength to a motor is improved.

One aspect of the invention provides a disk chucking apparatus that includes a chuck base having a plurality of holding portions, a plurality of chuck pins which are inserted in the holding portions to be elastically supported, and protrudes outwards from the chuck base, an elastic fragment which is arranged to correspond to the chuck pin with respect to the rotation center of the chuck base, and elastically supports a disk together with the chuck pin, and wherein the elastic fragment has an inclined surface inclined with respect to a direction of equipment of the disk, and the inclined surface are increased from smaller radius than the inner radius of the disk to larger radius than the inner radius of the disk.

One aspect of the invention provides a disk chucking apparatus that includes a chuck base having a plurality of holding portions, a plurality of chuck pins which are inserted in the holding portions to be elastically supported, and protrudes outwards from the chuck base, an elastic fragment which is arranged to correspond to the chuck pin with respect to the rotation center of the chuck base, and elastically supports a disk together with the chuck pin, where the elastic fragment has an inclined surface inclined with respect to a direction of equipment of the disk, and the inclined surface are increased from smaller radius than the inner radius of the disk to larger radius than the inner radius of the disk.

Another aspect of the invention provides a disk chucking apparatus that includes a chuck base having a plurality of holding portions; a plurality of chuck pins, which are inserted in the holding portions to be elastically supported, and which protrudes outwards from the chuck base; an elastic fragment, which is arranged to correspond to the chuck pin with respect to the rotation center of the chuck base, and which elastically supports a disk together with the chuck pin, where the elastic fragment may have an inclined surface inclined with respect to a direction of equipment of the disk, and the inclined surface may be increased from smaller radius than the inner radius of the disk to larger radius than the inner radius of the disk.

Still another aspect of the invention provides a disk chucking apparatus that includes: a chuck base having a plurality of holding portions; a plurality of chuck pins, which are inserted in the holding portions to be elastically supported, and which protrudes outwards from the chuck base; an elastic fragment, which is arranged to correspond to the chuck pin with respect to the rotation center of the chuck base, and which elastically supports a disk with the chuck pin; where the elastic fragment may be formed by a pair of cutting portions and an elastic hole may be formed at an end of the cutting portion.

Yet another aspect of the invention provides a disk chucking apparatus that includes: a chuck base, which have a plurality of holding portions and a center hole, the center hole which is a rotation center; a plurality of chuck pins, which are inserted in the holding portions to be elastically supported, and which protrudes outwards from the chuck base; an elastic fragment, which is arranged to corresponding to the chuck pin with respect to the center of the center hole, and which elastically supports a disk with the chuck pin; where a rotor holder of a motor are press-fitted into the center hole with respect to a longitudinal direction of the center hole, and a securing groove is formed.

Embodiments of the disk chucking apparatus according to the invention can contain one or more following feature. For example, the chuck pin may include a contacting portion, which protrudes out from the holding portion to contact a disk; and a body portion, which are elastically supported by a elastic member. And the contact portion may include a upper inclined portion and a lower inclined portion, which is formed in connection with the upper inclined portion.

The body portion may contain a pair of securing protrusions, which protrudes in the counter direction of the contacting portion, where the elastic members may be secured on the securing protrusions separately. And the lower inclined portion may be in contact with a contacting surface which is formed convexly. Also, the holding portions may be arranged around the center hole in same intervals. Also, the holding portions and the chuck pins which have been inserted in the holding portions may be formed at angles of 120 degrees.

The radius of the fore-end portion may be formed more largely than a radius of the chuck base. A disc may be pressed while in contact with the inclined portion to be mounted. And, the elastic hole may be formed more largely than width of the cutting portion. Adhesive agent may be filled in the securing groove, and a rotor holder of motor may be press-fitted in the center hole.

Additional aspects and advantages of the present invention will be set forth in part in the description which follows, and in part will be obvious from the description, or may be learned by practice of the invention.

DETAILED DESCRIPTION

The disk chucking apparatus and the disk drive according to certain embodiments of the invention will be described below in more detail with reference to the accompanying drawings, in which components that are the same or are in correspondence are rendered the same reference numbers, regardless of the figure number, and redundant descriptions are omitted.

Figure 1:
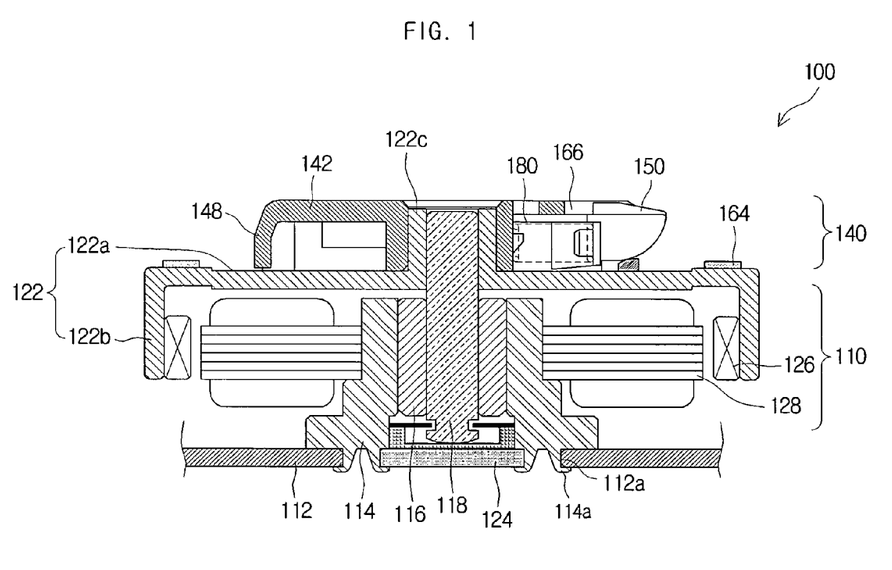
FIG. 1 is a cross-sectional view illustrating a disk drive according to an embodiment of the invention.

FIG. 1 is a cross-sectional view illustrating a disk drive according to an embodiment of the invention. In FIG. 1, a disk drive 100 according to an embodiment of the invention includes a disk chucking apparatus 140, on which a disk is inserted and secured, and a motor, which provides a driving force to the disk chucking apparatus 140. The disk (D) secured by the disk chucking apparatus 140 is rotated at a constant speed by the motor 100 such that a pickup device (not shown) can retrieve information recorded on the disk or can record information onto the disk.

The motor 100 provides a driving force to the disk chucking apparatus 140, and can include a rotor, being coupled to the disk chucking apparatus 140 to rotate together with the disk chucking apparatus 140, and a stator for providing a rotational force to the rotor.

The stator includes a bush 114, affixed to a frame 112, and coils 128, secured around the perimeter of the bush 114. Included inside the bush 114 is a sleeve 116, which supports a shaft 118 and allows a smoother rotation.

The bush 114, which is inserted into a hole 112a of the frame 112, includes a securing protrusion 114a at an end. The securing protrusion is inserted and bent into the hole 112a of the frame 112 such that the bush 114 can be affixed to the frame 112. The coils 128 are equipped around the perimeter of the bush 128, and an electric current is applied to the coils 128 and an electrical field is formed. The coils 128 are arranged adjacent to magnets 126, which are affixed to a rotor holder 122.

Also, a finishing plate 124 is inserted and secured in the center of the bush 114. The finishing plate 124 prevents a foreign substance from flowing into the bush 114 and supports an end of the shaft 118.

The rotor includes a shaft 118, supported by the sleeve 116, the rotor holder 122, being inserted into the shaft 118 and supporting the disk chucking apparatus 140, and a magnet 126, secured in the inner perimeter of the rotor holder 122.

The shaft 118 rotates together with the rotor holder 122 and transfers the rotational force to the disk chucking apparatus 140. One end of the shaft 118 is supported by the finishing plate, and the other end is inserted into the center hole 146 of the chuck base 142.

The rotor holder 122 is inserted into the shaft 118, rotates together with the shaft 118 and the disk chucking apparatus 140, and has a circular horizontal cross section. The rotor holder 122 is open downwards and includes a cover portion 122a, a circumference portion 122b extended along the circumference of the cover portions 112a and an inserting portion 122c inserted into the center hole 146 of the disk chucking apparatus 140.

The cover portion 122a is generally in the shape of a circular plate, and an upper surface of the cover portion 122a is in contact with the disk chucking apparatus 140. A cushion portion 164 is mounted on the upper surface of the cover portion 122a and is in contact with a rear surface of a disk in case the disk is mounted.

The circumference portion 122b encompasses the perimeter of the coils 128, and the magnet 126 is secured in the inner perimeter of the circumference portion 122b. An electromagnetic force, which is resulted from the interaction of a magnetic field formed by the magnet 126 and an electrical field formed by the coils 126, rotates the rotor and the disk chucking apparatus 140.

The shaft 118 may be inserted into the inside of the inserting portion 122c, which protrudes upward from the cover portion 112a. And the center hole 146 of the disk chucking apparatus 140 is inserted onto the outside of the inserting portion 122c. Hence, the rotational force of the shaft 118 is transferred to the rotor holder 122 and the disk chucking apparatus 140.

While a spindle motor is illustrated as a device that provides a driving force to the disk chucking apparatus 140 in FIG. 1, the invention is not thus limited to this example, and it is to be appreciated that various types of driving device, such as brushless direct motor, etc., can be used.

The disk chucking apparatus 140 according to an embodiment of the invention will now be described below with reference to FIG. 2 through FIG. 8.

Figure 2:
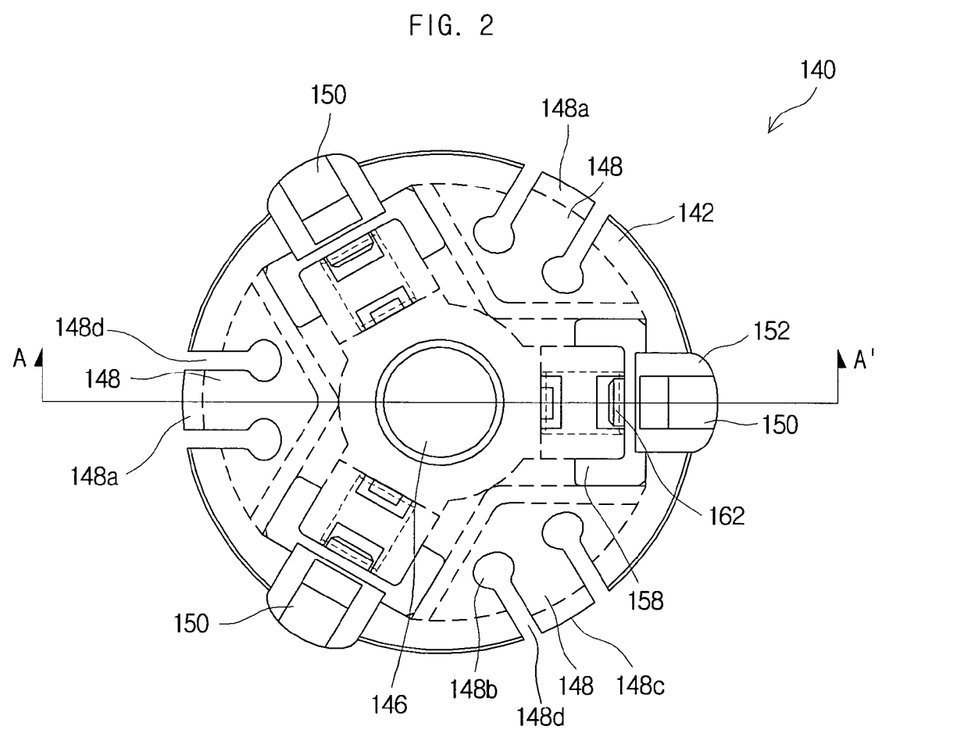
FIG. 2 is a plan view illustrating a disk chucking apparatus according to an embodiment of the invention.
Figure 3:
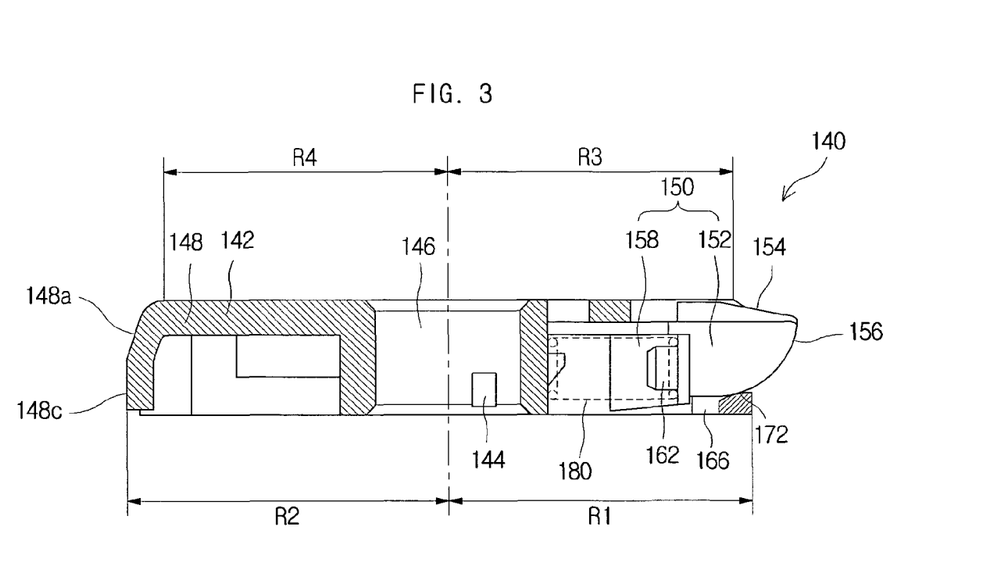
FIG. 3 is a cross-sectional view of the disk chucking apparatus of FIG. 2, viewed along the AA' line.

FIG. 2 is a plan view illustrating a disk chucking apparatus according to an embodiment of the invention, and FIG. 3 is a cross-sectional view of the disk chucking apparatus, along the AA' line of FIG. 2.

The disk chucking apparatus 140 is provided with a driving force by the inserting portion 122c of the rotor holder 122, which is inserted into the center hole 146 formed in the middle, to rotate at a constant speed. The disk chucking apparatus 140 includes the chuck base 142, into which the inserting portion 122c is inserted, a chuck pin 150, which is inserted into the chuck base 142 to protrude outward from the chuck base 142, an elastic member 180, which elastically supports the chuck pin 150, and the elastic fragment 148, which is symmetrical with the chuck pin 150 around the center hole 146.

The chuck base 142 has a circular shape, and the center hole 146 is formed in the middle. The inserting portion 122c of the rotor holder 122 is inserted into the center hole 146. The holding portions 166, in which the chuck pin 140 is inserted, is formed along the circumference of the center hole 146 at regular intervals. The center of the disk is inserted onto the chuck base 142, which becomes the rotational center of the disk.

The chuck pins 150 are inserted into the holding portion 166 to protrude outwards. The chuck pin 150 located in the inner part of the holding portion 166 protrudes outward due to the elastic force of the elastic members 180, and the chuck pin 150 is positioned back into the holding portion 166 to press the inner perimeter of the disk (D) when the disk is inserted.

The elastic fragment 148 is formed at a position corresponding to the chuck pin 150 with reference to the center hole 146. The elastic fragment 148 is formed by a cutoff portion 148d, which is formed by cutting a portion of the chuck base 142. An elastic hole 148b is formed at an end of the cutting portion 148d, and a fore-end contacting a disk is formed in the middle of the elastic fragment 148. While the elastic fragments 148 are formed around the center hole 146 at an angle of about 120 degrees in FIG. 2, the embodiment is not thus limited, and it is to be appreciated that the elastic fragments 148 can be formed at various angles.

The chuck pins 150 are inserted into the holding portion 166 and protrude outwards by an elastic force of the elastic members 180, and a contact portion 152 presses the inner perimeter of the disk (D). Three chuck pins 140 can be arranged around the center hole 146 at angles of 120 degrees. In such a case, there may also be three holding portions 166 arranged at 120-degree angles. Thus, the chuck pins 150 and the elastic members 180 that elastically support the chuck pins 140 can be positioned in a triangular arrangement.

While the disk chucking apparatus 140 described in this embodiment is illustrated with three chuck pins 150, the invention is not thus limited, and it is to be appreciated that any of various numbers of chuck pins 150 may be included according to design conditions, and so on. For example, four, five, or six chuck pins 140 can be arranged at regular intervals.

The elastic members elastically presses the chuck pin 150 on the rear surface of the body portion 158 of the chuck pin 150. Thus, if the disk is not mounted, the chuck pin 150 protrudes outwards from the holding portion 166, and if the disk is mounted, the chuck pin 150 is positioned back into the holding portion 166 to support the disk. Although the elastic member can be a compression spring of helical type, a torsion spring of helical coil type or a torsion spring of circular ring type, the invention is not thus limited to these springs.

The center hole 146 is the rotational center of the disk chucking apparatus 140, and the inserting portion 122c of the rotor holder 122 is inserted into the center hole 146. As illustrated in FIG. 3, a securing groove 144 having a particular length is formed on the center hole 146. The rotor holder 122 of the motor 110 is press-fitted into the center hole 146 with respect to a whole length-direction of the center hole 146.

Then, adhesive agents are filled in the securing groove 144 during the assembling of the motor 110.

In FIG. 3, the distance R2 between the center line (depicted by dashed-dotted lines) of the disk chucking apparatus 140 and the fore-end 148c of the fragment 148 is longer than the radius R1 of the chuck base 142. The distance R4 between the center line of the disk chucking apparatus 140 and the starting point of the elastic fragment 148 is similar to the distance R3(<R1), which is a little shorter than the radius R1 of the chuck base 142.

Figure 4:
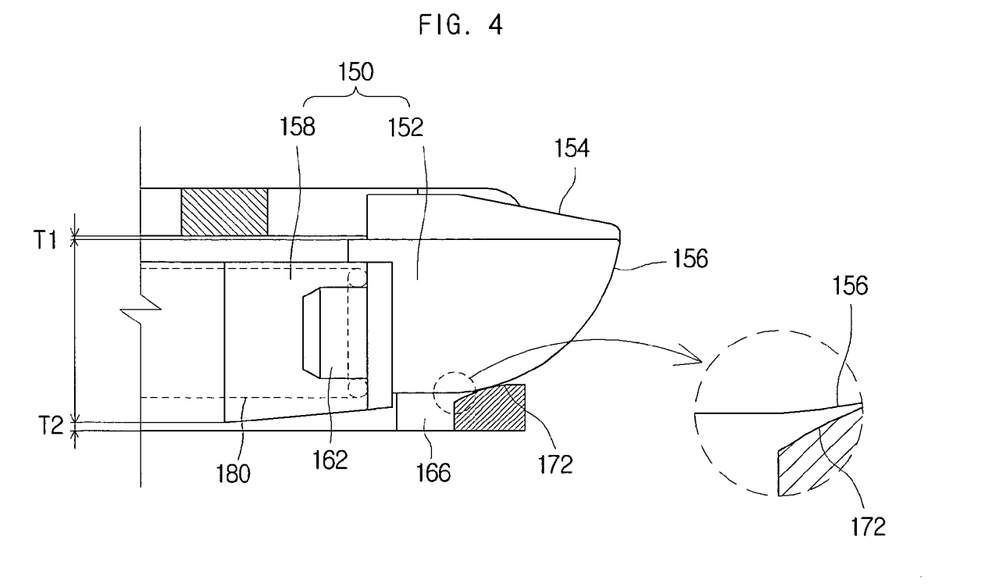
FIG. 4 is a cross-sectional view illustrating a holding structure of a chuck pin in a disk chucking apparatus according to an embodiment of the invention.

FIG. 4 is a cross-sectional view illustrating a state of a chuck pin 150 protruding towards an outer side of the holding portion 166 in the disk chucking apparatus 140 according to an embodiment of the invention.

Referring to FIG. 4, the chuck pin 150 may elastically press the inner perimeter of a disk while moving in a straight line in the holding portion 166. The chuck pin 150 includes a contacting portion, which is in contact with a disk, and a body portion 158, which is in contact with the elastic member 180. The contact portion 152 is in contact with the disk and contains an upper contact portion 154 and a lower contact portion 156, each of which has a different radius of curvature. And a securing protrusion 162 for securing the elastic member 180 is formed on the rear surface of the body portion 158.

In case a disk is mounted, the disk pushes the chuck pin 150 into the inner side of the chuck pin 150 while moving along the upper contact portion 154. And the lower contact portion formed in connection with the upper contact portion 154 has a smaller radius of curvature than the upper contact portion 154. The lower contact portion 156 is in contact with the contacting surface 172 while the chuck pin 150 protrudes outwards. The contacting surface 172 has a convex shape of cross-section, which prevents a lot of stress from occurring between the contacting surface 172 and the lower contact portion 156. Therefore, even if the lower contact portion 156 is in contact with the contacting surface 172, a lot of stresses do not occur.

A securing protrusion 162 is protruded in the opposite direction of the contact portion 152 on the rear surface of the body portion 158. The body portion 158 is placed at a constant distance (T1, T2) from the inner side of the holding portion 166. This distance (T1, T2) makes the chuck pin 150 inclined upwards or downwards while a disk is mounted or drawn out. The less this distance (T1, T2) is, the less the inclination of the chuck pin 150 is while the disk is mounted or drawn out, increasing the securing force of the chuck pin 150.

Figure 5:
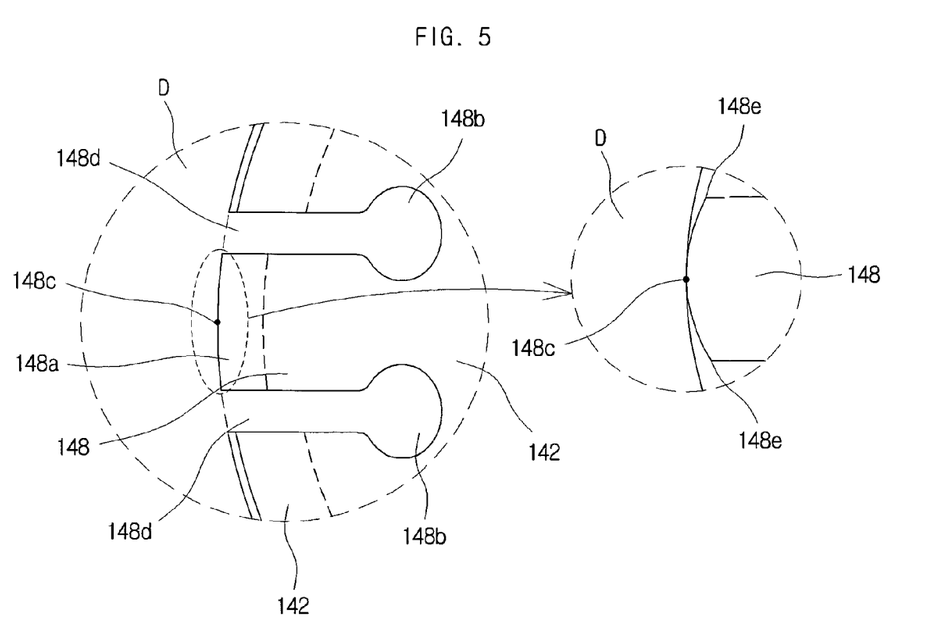
FIG. 5 is a magnified plan view illustrating an elastic fragment in a disk chucking apparatus according to an embodiment of the invention.

FIG. 5 is a magnified plan view illustrating an elastic fragment in a disk chucking apparatus according to an embodiment of the invention.

Referring to FIG. 5, a pair of cutting portions 148d, which are formed by removing a portion of the chuck base 142, is formed on the right side and left side of the elastic fragment 148. The elastic fragment 148 is formed by the cutting portions 148d. The cutting portion 148d is formed in particular lengths, and the elastic hole 148b is formed at one end of the cutting portion 148d. The elastic hole 148d is a little larger than the width of the cutting portion 148d. Due to the elastic hole 148d, the elastic fragment 148 can receive relatively less stress when the disk is mounted or drawn out. Therefore, a relatively less force is needed in mounting/separating the disk.

As illustrated in FIG. 3 and FIG. 5, the most protrusive portion in the elastic fragment 148 is the fore-end portion 148c. As the fore-end portion 148c is formed in the middle of the elastic fragment 148 and is protrusive than both sides 148e and the chuck base 142, when the disk (D) is mounted, the fore-end 148c only contacts with the disk (D). As the radius of the fore-end 148c is formed to be a little larger than the radius of the inner center of the disk (D), if the disk (D) is mounted, the fore-end 148c is bent to provide the disk (D) with an elastic force. Also, as the radii of the both sides 148e are formed a little smaller than the radius of the disk (D), even if the disk (D) is mounted, the both sides are not in contact with the disk (D).

As the disk (D) is in contact with the fore-end 148c, the center of the disk (D) can be easily arranged, and a relatively smaller force is needed in mounting/separating the disk.

Figure 6:
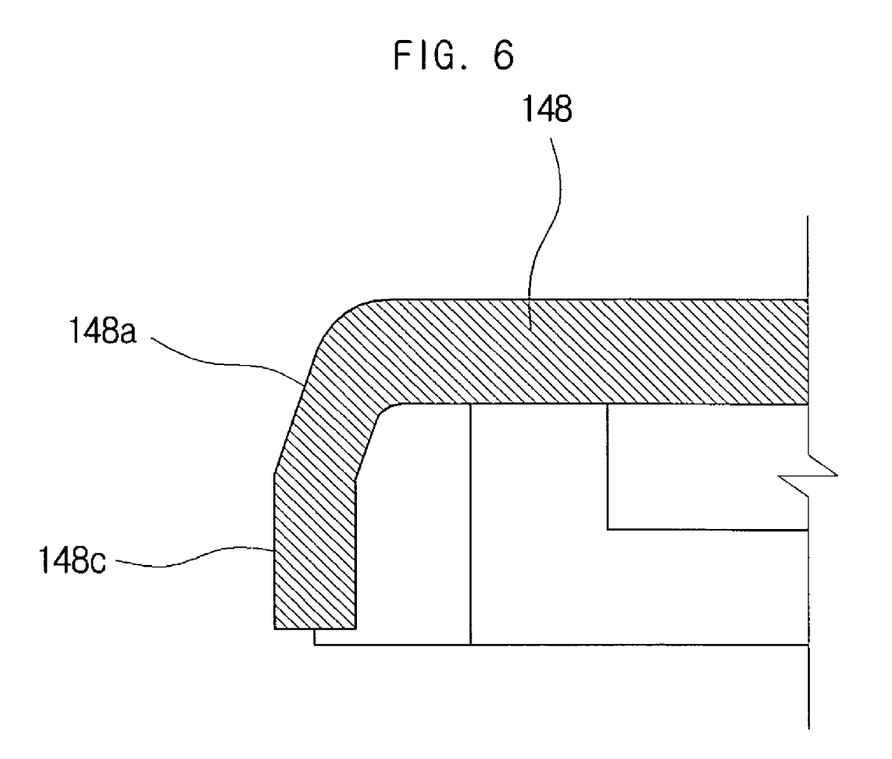
FIG. 6 is a cross-sectional view illustrating an elastic fragment in a disk chucking apparatus according to an embodiment of the invention.
Figure 7A:
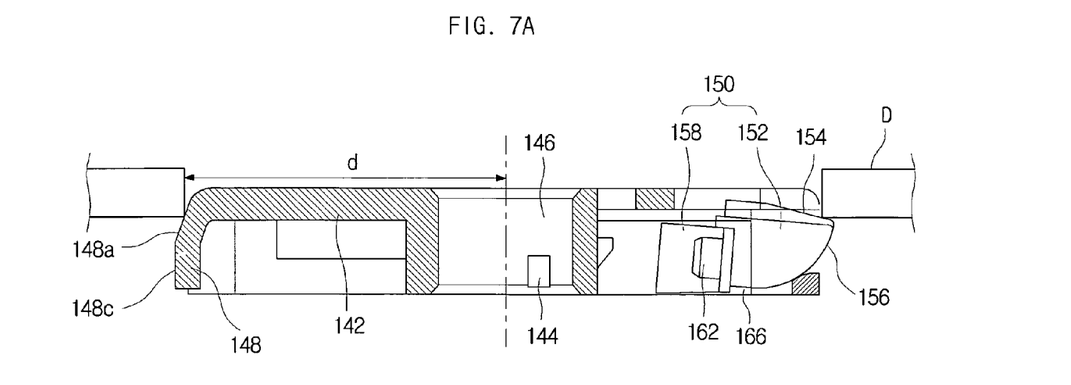
FIG. 7a is a cross-sectional view illustrating a state of mounting a disk in a disk chucking apparatus according to an embodiment of the invention.

FIG. 6 is a cross-sectional view illustrating an elastic fragment in a disk chucking apparatus according to an embodiment of the invention. FIG. 7a is a cross-sectional view illustrating a state of mounting a disk (D) in the disk chucking apparatus, and FIG. 7b is a cross-sectional view illustrating a state of the disk (D) having been mounted in the disk chucking apparatus.

Figure 7B:
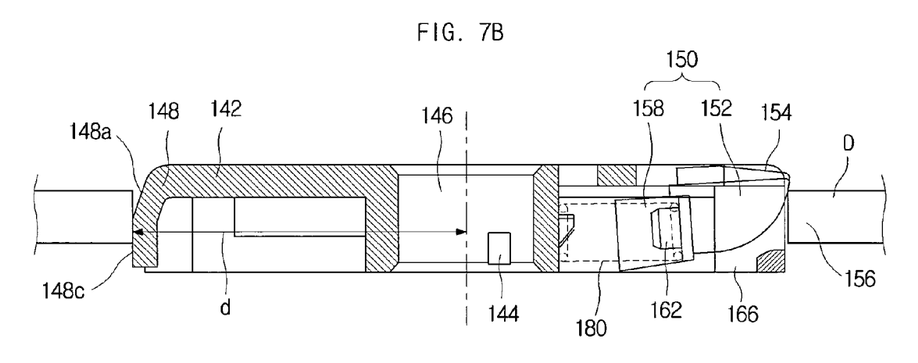
FIG. 7b is a cross-sectional view illustrating a state of a disk having been mounted in a disk chucking apparatus according to an embodiment of the invention.

Referring to FIG. 6, FIG. 7a and FIG. 7b, the elastic fragment 148 has an inclined surface 148a. The diameter of the inclined surface 148a is increased gradually from a diameter smaller than the inner radius (d) of the disk (D). That is, as illustrated in FIG. 7a, as the inclined surface 148a is smaller than the inner radius of the disk before the disk is mounted, the elastic fragment 148 is not bent. Hence, as the elastic fragment 148 is not bent in mounting the disk, large force is not needed in an early stage of mounting the disk. However, the disk (D) presses the upper contact portion to incline the chuck pin 150 downwards.

As illustrated in FIG. 7b, the radius of the fore-end 148c of the elastic fragment 148 is larger than the inner radius of the disk (D) in mounting the disk (D), and thus the disk (D) presses the elastic fragment 148 to be bent. Here, the disk (D) is in contact with the most protrusive fore-end 148c. If the disk is mounted, the inside of the disk (D) is pressed by the chuck pin 150.

Thus, in a disk chucking apparatus according to an embodiment of the invention, as the pressure by the chuck pin 150 and the elastic fragment 148 occurs not at once, but successively, in mounting the disk, the stress applied to the disk (D) and the disk chucking apparatus can be decreased in mounting the disk.

Figure 8A:
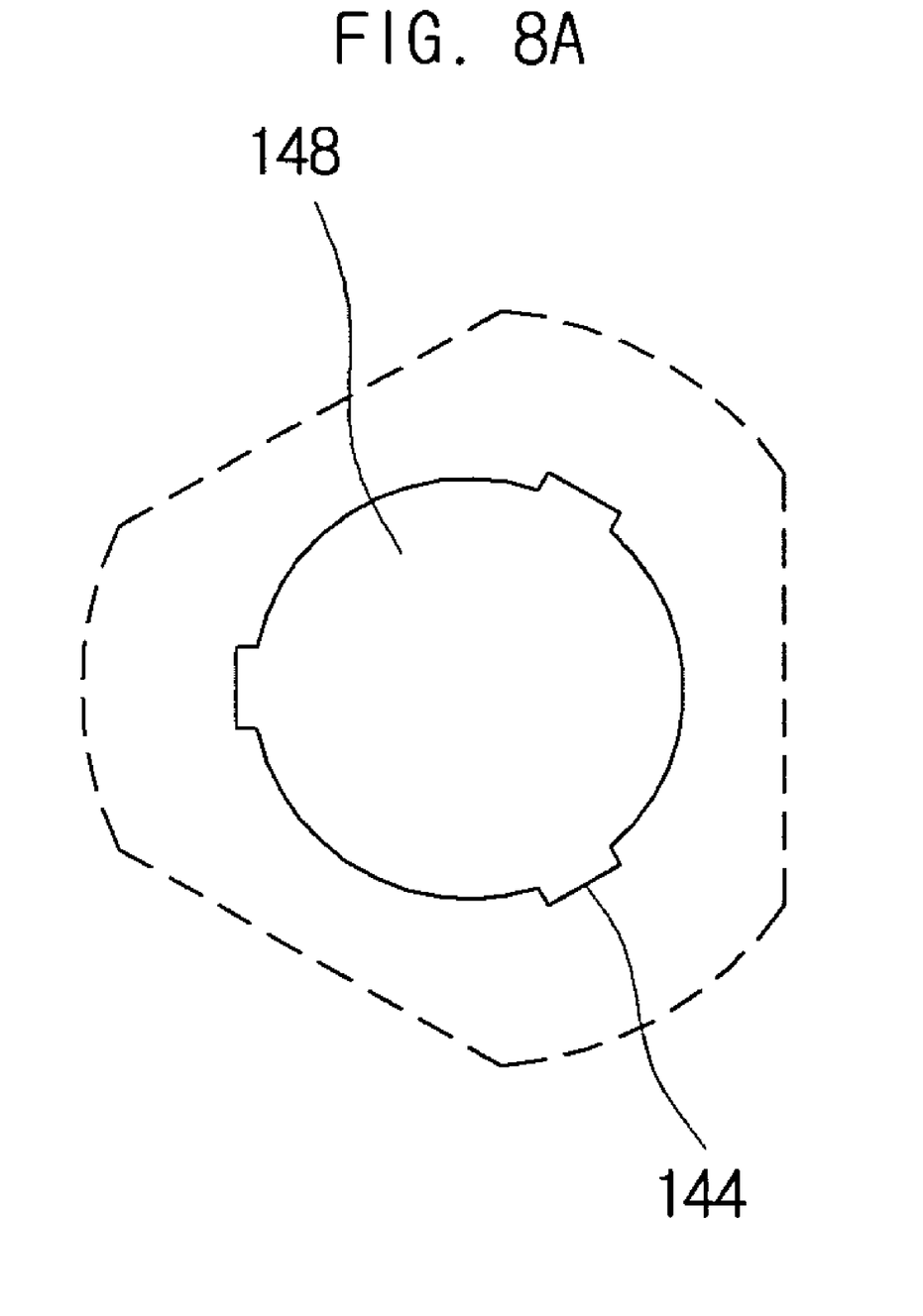
FIG. 8a and FIG. 8b are plan views illustrating a center hole in a disk chucking apparatus according to an embodiment of the invention.
Figure 8B:
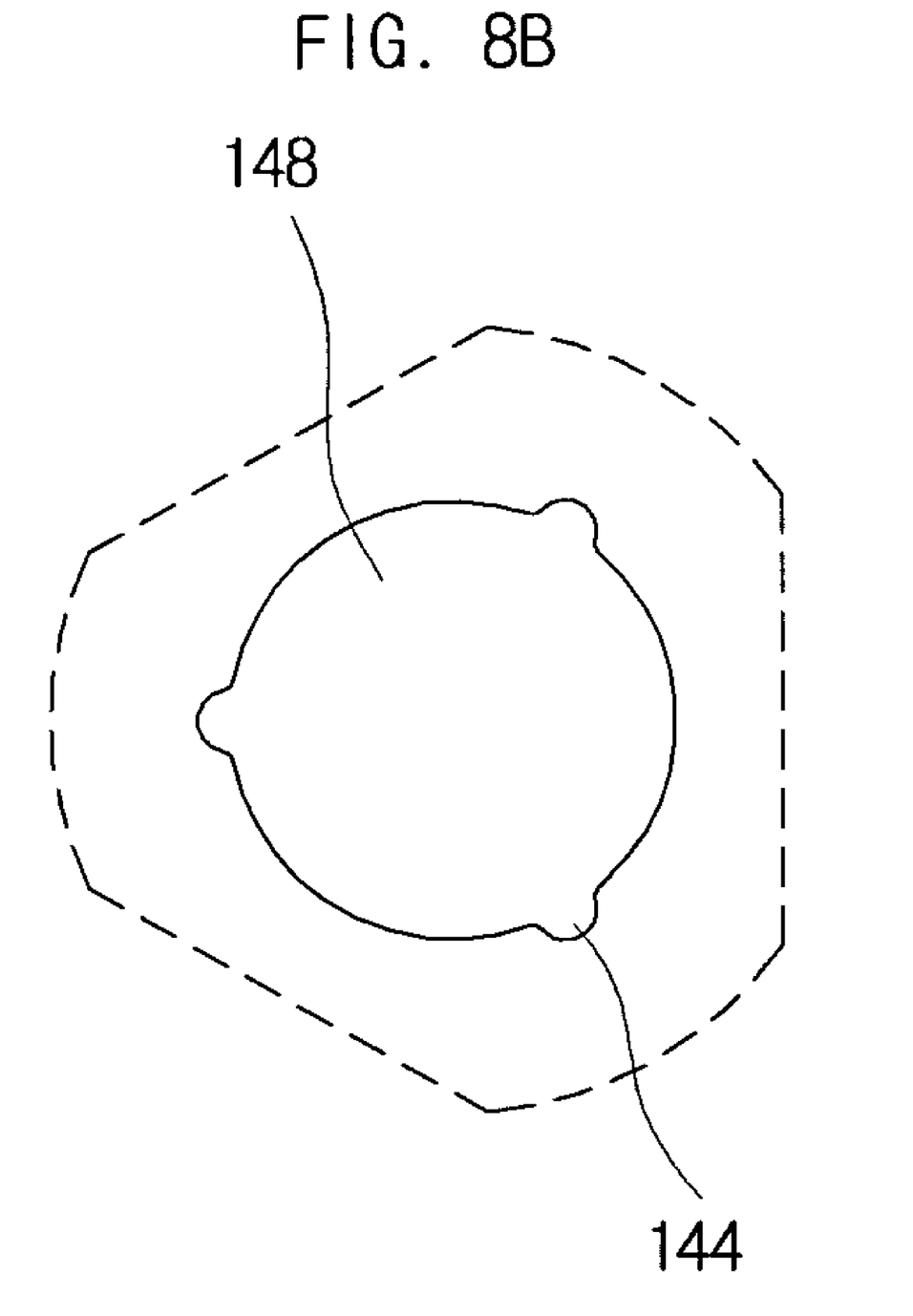

FIG. 8a and FIG. 8b are plan views illustrating a center hole in a disk chucking apparatus according to an embodiment of the invention.

Referring to FIG. 8a through FIG. 8b, a securing groove 144, which has a smaller height than the center hole 146, is formed on the inner perimeter of the center hole 146. The securing groove 144 is arranged on the inner perimeter of the center hole 146 at particular intervals. As the inserting portion 122c illustrated in FIG. 1 is press-fitted into the center hole 146 with respect to a whole height of the center hole 146, a coupling force of the center hole 14 and the holding portion 122c can be increased. Also, the inserting portion 122c is press-fitted into the center hole 146, and then an adhesive agent is filled in the securing groove to further strengthen the coupling of the center hole 146 and the inserting portion 122c.

The securing groove 144 illustrated in FIG. 8a has a tetragonal shape of cross-section, and the securing groove 144 illustrated in FIG. 8b has a semicircular shape of cross-section. Of cause, the shape of the securing groove 144 is not thus limited.

Figure 9A:
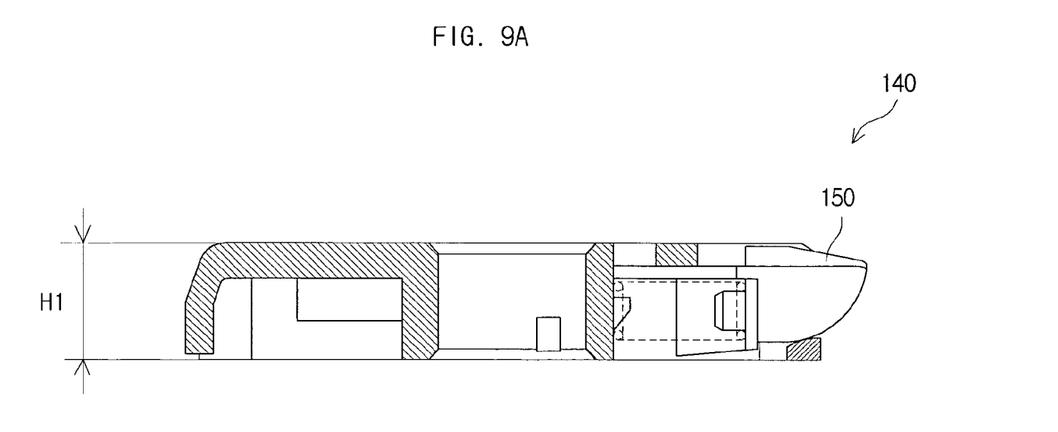
FIG. 9a through FIG. 9c are cross-sectional views illustrating various heights of a disk chucking apparatus according to an embodiment of the invention.
Figure 9B:
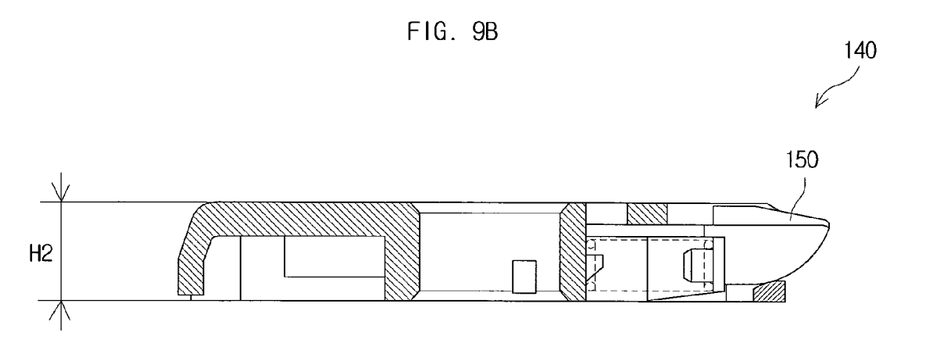
Figure 9C:
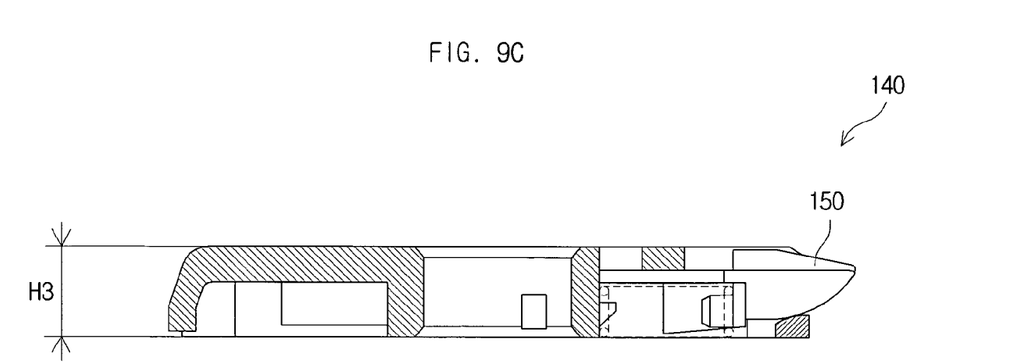

FIG. 9a through FIG. 9c are cross-sectional views illustrating various heights of a disk chucking apparatus according to an embodiment of the invention. FIG. 9a illustrates a slim drive device having H1 of 12.7 mm, and FIG. 9b illustrates an ultra slim drive device having H2 of 9.5 mm. FIG. 9c shows a super ultra slim drive device having H3 of 7.5 mm.

Referring to FIG. 9a to FIG. 9c, the disk chucking apparatus 140 according to the embodiments of the invention can be formed in various heights while maintaining nearly similar shapes. That is, the disk chucking apparatuses 140 illustrated in FIG. 9a to FIG. 9c are different only in heights (i.e., H1>H2>H3) and the shape of the chuck pin 150, but all other elements are the same. Hence, if only the height and shape of the disk chucking apparatus according to this embodiment are changed, the disk chucking apparatus of various heights can be formed to fabricate a disk chucking apparatus conveniently.

According to certain aspects of the invention as set forth above, certain aspects of the invention can align the centers of a disk and a chuck base easily.

Also, the force needed in mounting a disk can be decreased.

In addition, the coupling strength with a motor can be improved.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A disk chucking apparatus, comprising:
   a chuck base having a plurality of holding portions;
   a plurality of chuck pins being inserted in the holding portions to be elastically supported and protruding outwards from the chuck base; and
   an elastic fragment arranged symmetrically to the chuck pin about the rotational center of the chuck base and elastically supporting a disk with the chuck pin,
   wherein the disk is in contact with a fore-end formed in the middle of the elastic fragment.

2. The disk chucking apparatus of claim 1, wherein the chuck pin comprises:
   a contact portion protruding outwards from the holding portion to contact a disk; and
   a body portion elastically supported by an elastic member.

3. The disk chucking apparatus of claim 2, wherein the contact portion comprises:
   an upper inclined portion; and
   a lower inclined portion formed in connection with the upper inclined portion.

4. The disk chucking apparatus of claim 2, wherein the body portion comprises a pair of securing protrusions protruded in an opposite direction of the contacting portion,
   wherein each of the elastic members is secured on each of the securing protrusions.

5. The disk chucking apparatus of claim 2, wherein the lower inclined portion is in contact with a contacting surface formed convexly.

6. The disk chucking apparatus of claim 1, wherein the holding portions are arranged around the center hole at regular intervals.

7. The disk chucking apparatus of claim 6, wherein the holding portions and the chuck pins inserted in the holding portions are formed at angles of 120 degrees.

8. The disk chucking apparatus of claim 1, wherein a radius of the fore-end portion is larger than a radius of the chuck base.

9. A disk drive comprising any one disk chucking apparatus of claim 1.

10. A disk chucking apparatus, comprising:
a chuck base having a plurality of holding portions;
a plurality of chuck pins being inserted in the holding portions to be elastically supported and protruding outwards from the chuck base; and
an elastic fragment arranged symmetrically to the chuck pin about the rotational center of the chuck base and elastically supporting a disk together with the chuck pin,
wherein the elastic fragment has an inclined surface inclined with respect to a direction of mounting the disk, and the radius of the inclined surface is increased from a radius smaller than an inner radius of the disk to a radius larger than the inner radius of the disk.

11. The disk chucking apparatus of claim 10, wherein the chuck pin comprises:
a contact portion protruding outwards from the holding portion to contact a disk; and
a body portion elastically supported by an elastic member.

12. The disk chucking apparatus of claim 11, wherein the contact portion comprises:
an upper inclined portion; and
a lower inclined portion formed in connection with the upper inclined portion.

13. The disk chucking apparatus of claim 11, wherein the body portion comprises a pair of securing protrusions protruded in an opposite direction of the contacting portion,
wherein each of the elastic members is secured on each of the securing protrusions.

14. The disk chucking apparatus of claim 11, wherein the lower inclined portion is in contact with a contacting surface formed convexly.

15. The disk chucking apparatus of claim 10, wherein the holding portions are arranged around the center hole at regular intervals.

16. The disk chucking apparatus of claim 15, wherein the holding portions and the chuck pins inserted in the holding portions are formed at angles of 120 degrees.

17. The disk chucking apparatus of claim 10, wherein the disk is mounted while being in contact with and pressing against the inclined portion.

18. A disk drive comprising any one disk chucking apparatus of claim 10.

19. A disk chucking apparatus, comprising:
a chuck base having a plurality of holding portions;
a plurality of chuck pins being inserted in the holding portions to be elastically supported such that the chuck pins can protrude outwards from the chuck base; and
an elastic fragment arranged symmetrically to the chuck pin about the rotational center of the chuck base and elastically supporting a disk together with the chuck pin,
wherein the elastic fragment is formed by a pair of cutting portions and an elastic hole is formed at an end of the cutting portion.

20. The disk chucking apparatus of claim 19, wherein the chuck pin comprises:
a contact portion protruding outwards from the holding portion to contact a disk; and
a body portion elastically supported by an elastic member.

21. The disk chucking apparatus of claim 20, wherein the contact portion comprises:
an upper inclined portion; and
a lower inclined portion formed in connection with the upper inclined portion.

22. The disk chucking apparatus of claim 20, wherein the body portion comprises a pair of securing protrusions protruded in an opposite direction of the contacting portion,
wherein each of the elastic members is secured on each of the securing protrusions.

23. The disk chucking apparatus of claim 20, wherein the lower inclined portion is in contact with a contacting surface formed convexly.

24. The disk chucking apparatus of claim 19, wherein the holding portions are arranged around the center hole at regular intervals.

25. The disk chucking apparatus of claim 24, wherein the holding portions and the chuck pins inserted in the holding portions are formed at angles of 120 degrees.

26. The disk chucking apparatus of claim 19, wherein the elastic hole is larger than a width of the cutting portion.

27. A disk drive comprising any one disk chucking apparatus of claim 19.

28. A disk chucking apparatus, comprising:
a chuck base having a plurality of holding portions and a center hole being a rotational center;
a plurality of chuck pins being inserted in the holding portions to be elastically supported and protruding outwards from the chuck base; and
an elastic fragment arranged symmetrically to the chuck pin about the center of the center hole and elastically supporting a disk with the chuck pin,
wherein a rotor holder of a motor is press-fitted into the center hole along a whole length-direction of the center hole, and a securing groove is formed on the inner perimeter of the center hole.

29. The disk chucking apparatus of claim 28, wherein the chuck pin comprises:
a contact portion protruding outwards from the holding portion to contact a disk; and
a body portion elastically supported by an elastic member.

30. The disk chucking apparatus of claim 29, wherein the contact portion comprises:
an upper inclined portion; and
a lower inclined portion formed in connection with the upper inclined portion.

31. The disk chucking apparatus of claim 29, wherein the body portion comprises a pair of securing protrusions protruded in an opposite direction of the contacting portion,
wherein each of the elastic members is secured on each of the securing protrusions.

32. The disk chucking apparatus of claim 29, wherein the lower inclined portion is in contact with a contacting surface formed convexly.

33. The disk chucking apparatus of claim 28, wherein the holding portions are arranged around the center hole at regular intervals.

34. The disk chucking apparatus of claim 33, wherein the holding portions and the chuck pins inserted in the holding portions are formed at angles of 120 degrees.

35. The disk chucking apparatus of claim 28, wherein adhesive agent is filled in the securing groove, and a rotor holder of a motor is inserted in the center hole.

36. A disk drive comprising any one disk chucking apparatus of claim 28.

\* \* \* \* \*